US010906233B2

(12) United States Patent
Ur (10) Patent No.: US 10,906,233 B2
(45) Date of Patent: Feb. 2, 2021

(54) PRINT-HEAD FOR A 3D PRINTER (71) Applicant: Shmuel Ur Innovation LTD., Shorashim (IL)

(72) Inventor: Shmuel Ur, Shorashim (IL)

(73) Assignee: Shmuel Ur Innovation LTD., Shorashim (IL)

( * ) Notice: Subject to any disclaimer, the term of this patent is extended or adjusted under 35 U.S.C. 154(b) by 284 days.

(21) Appl. No.: 15/256,678

(22) Filed: Sep. 5, 2016

(65) Prior Publication Data

US 2017/0066189 A1   Mar. 9, 2017

(30) Foreign Application Priority Data

Sep. 6, 2015   (IL) .......................................... 241219

(51) Int. Cl.
*B29C 64/112* (2017.01)
*B29C 67/00* (2017.01)
*B33Y 10/00* (2015.01)
*B33Y 30/00* (2015.01)
*B29C 64/209* (2017.01)
*B29C 64/232* (2017.01)
*B29C 64/236* (2017.01)
*B29C 64/241* (2017.01)
*B29C 64/295* (2017.01)

(52) U.S. Cl.
CPC .......... *B29C 64/112* (2017.08); *B29C 64/209* (2017.08); *B29C 64/232* (2017.08); *B29C 64/236* (2017.08); *B29C 64/241* (2017.08); *B29C 64/295* (2017.08); *B29C 67/0059* (2013.01); *B33Y 10/00* (2014.12); *B33Y 30/00* (2014.12)

(58) Field of Classification Search
CPC ....... B33Y 10/00; B33Y 30/00; B29C 64/209; B29C 67/0059; B41J 2/145; B41J 25/304
See application file for complete search history.

(56) References Cited

U.S. PATENT DOCUMENTS

| | | | |
|---|---|---|---|
| 2013/0015596 A1 | 1/2013 | Mozeika et al. | |
| 2014/0044822 A1* | 2/2014 | Mulliken | ........... H04N 1/00827 |
| | | | 425/113 |
| 2014/0054817 A1* | 2/2014 | Jaffe | ..................... B29C 64/106 |
| | | | 264/129 |
| 2014/0300017 A1 | 10/2014 | Wighton et al. | |
| 2015/0024169 A1 | 1/2015 | Martin et al. | |
| 2015/0042678 A1 | 2/2015 | Alt et al. | |
| 2015/0105891 A1 | 4/2015 | Golway et al. | |

(Continued)

FOREIGN PATENT DOCUMENTS

| | | |
|---|---|---|
| CN | 204585844 U | 8/2015 |
| WO | 2014/165265 | 10/2014 |

(Continued)

*Primary Examiner* — Matthew J Daniels
*Assistant Examiner* — Asha A Thomas
(74) *Attorney, Agent, or Firm* — The Law Office of Joseph L. Felber (57) ABSTRACT

Embodiments disclosed herein produce products by adding material on an existing object. Printing onto existing objects may be used to repair/rebuild/fix the existing objects. Other embodiments print on a lateral edge of an object. A print-head unit may be implemented that can horizontally rotate to produce the product by adding layers of materials on the existing object.

22 Claims, 5 Drawing Sheets

(56) References Cited

U.S. PATENT DOCUMENTS

2015/0147427 A1* 5/2015 Lundwall ............... B33Y 10/00
                                                    425/375
2015/0165686 A1   6/2015 Liu et al.
2016/0009030 A1*  1/2016 Mark .................. B29C 67/0085
                                                    264/308

FOREIGN PATENT DOCUMENTS

WO   2015/038072   3/2015
WO   2015/057886   4/2015

* cited by examiner

PRINT-HEAD FOR A 3D PRINTER

RELATED APPLICATION

This application claims priority under 35 U.S.C. § 119 to Israeli Patent Application No. 241219, filed Sep. 6, 2015, which is hereby incorporated by reference in its entirety without giving rise to disavowment.

TECHNICAL FIELD

The present disclosure relates to three-dimensional printing on objects in general, and to print-heads for three-dimensional printers, in particular.

BACKGROUND

Three-dimensional printing is a process of producing three-dimensional objects from three-dimensional model data (e.g., a digital representation of the object). Additive manufacturing processes may be used in three-dimensional printing, in which three-dimensional objects are produced by successively adding layers of materials under computer control. The layers of materials are added layer by layer until the entire product is created. Each layer can be seen as thinly sliced horizontal cross-section of the eventual product. Each layer is fused by adding material in desired locations. In some cases, the three-dimensional printer may utilize a variety of different materials to produce a product.

A three-dimensional printer is an industrial robot having a moveable print-head. The three-dimensional printer may contain a print-head moving through a three-dimensional work envelope transforming a mass of raw material into a desired shape, optionally in a layer by layer manner. The print-head may heat the material and turn the flow of material on and off. Typically, motors (e.g, servo motors, stepper motors) are employed to move the extrusion of the print-head and adjust the flow of material. The print-head can be moved in both horizontal and vertical directions, and control of the mechanism is typically done by a computer-aided manufacturing (CAM) software package running on a microcontroller of the three-dimensional printer. Additionally or alternatively, other software and/or hardware components may be used for controlling Print-head unit 400.

BRIEF SUMMARY

One exemplary embodiment of the disclosed subject matter is a print-head unit for use in an additive manufacturing apparatus, the print-head unit comprising: a flow channel having an inlet end and an outlet end, wherein said inlet end is configured to receive printing material; a nozzle coupled to said outlet end of said flow channel, wherein said nozzle is configured to extrude the printing material from said flow channel onto a workplace, wherein said nozzle is located at a lateral portion of said print-head unit; and wherein said print-head unit is configured to horizontally rotate.

Optionally, said print-head unit is configured to move in three perpendicular axes in addition to being configured to rotate around a vertical axis to horizontally rotate, whereby the print-head having exactly four degrees of freedom.

Optionally, said print-head unit is configured to horizontally rotate around said nozzle.

Optionally, the print-head unit comprises a heating component configured to heat the printing material while in said flow channel.

Optionally, said heating component is configured to heat the printing material to a temperature at which the printing material is flowable.

Optionally, said nozzle is located at the bottom of said print-head unit.

Optionally, said nozzle is located in a manner allowing said nozzle to be positioned vertically adjoining an object in the workplace.

Optionally, said print-head unit is detachable from the additive manufacturing apparatus, wherein said print-head unit comprising a motor configured to horizontally rotate the print-head unit providing a single degree of freedom.

Optionally, said print-head unit is configured to move in three perpendicular axes, wherein the movement in the three perpendicular axes is performed by one or more motors external to said print-head unit, wherein the one or more motors are mounted on the additive manufacturing apparatus.

Optionally, the print-head unit further comprising a platform located below said nozzle, wherein said platform is positioned so as to receive printing material extruded from said nozzle.

Optionally, said platform is positioned so as to direct the printing material in a direction that is substantially perpendicular to said flow channel.

Optionally, said platform is displaceable, wherein in a displaced mode, said platform does not receive the printing material extruded from said nozzle.

Optionally, the print-head unit further comprising a heating component that is coupled to said platform, wherein said heating component is configured to heat said platform.

Another exemplary embodiment of the disclosed subject matter is a detachable print-head unit for use in an additive manufacturing apparatus, wherein the additive manufacturing apparatus configured to move an attached print-head unit in three perpendicular axes, the print-head unit comprising: a flow channel having an inlet end and an outlet end, wherein said inlet end is configured to receive printing material; a nozzle coupled to said outlet end of said flow channel, wherein said nozzle is configured to extrude the printing material from said flow channel onto a workplace, wherein said nozzle is located at a lateral portion of said print-head unit; and a motor configured to horizontally rotate said detachable print-head unit, thereby, when said detachable print-head unit is attached to the additive manufacturing apparatus, said detachable print-head unit having four degrees of freedom movement.

Yet another example embodiment of the disclosed subject matter is a method for producing a product by adding material to an object, wherein the method is performed by an additive manufacturing apparatus having a print-head unit, wherein the print-head unit comprises a nozzle for extruding printing material, wherein the additive manufacturing apparatus having a workspace, wherein the object is located in the workspace, wherein said method comprising: moving the print-head unit in a four degrees of freedom movement to position the nozzle at a first location; adding material by extruding printing material at the first location; and moving the print-head unit in the four degrees of freedom movement to position the nozzle at a second location; wherein at least one of the first location and the second location is adjoining a lateral edge of the object.

Optionally, both the first location and the second location are adjoining lateral edges of the object.

Optionally, the four degrees of freedom movement consist only of a movement along three perpendicular axes and a yaw rotation about a vertical axis.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to produce products by adding material on an existing object. In some cases, the geometry of the print-head, in which a nozzle extruding the printing material is located in a center of the print-head, may create a constraint on its ability to be positioned adjacently to an existing object and add material on its side surface.

One potential solution may be to provide for a print-head with six degrees of freedom movement, thereby allowing the print-head to be positioned in any desired position albeit its geometry. However, providing six degrees of freedom may require a costly apparatus that may not be available or feasible for home use, as the robotic arm carrying the print-head may need to be improved and adjusted accordingly to allow for the desired freedom of movement. Furthermore, a solution which may be implemented on existing three-dimensional printers which have a limited number of degrees of freedom, such as three (X,Y,Z) may be preferable.

An object may be created by adding printing material layer by layer, successively until the entire object is created. In some cases, a virtual blueprint of the object may be created by a computer program. The computer program may divide the object into digital cross-sections so the three-dimensional printer is able to build it layer by layer. The cross-sections may essentially act as guides for the three-dimensional printer, to print each layer in the exact size and shape. The printing material may be emitted, sprayed, squeezed or otherwise extruded from a head-print unit of the three-dimensional printer onto a workspace of the three-dimensional printer. The three-dimensional printer may perform passes over a platform of its workspace to create a layer of the printing material. The three-dimensional printer may deposit a layer on top of layers of material to create the finished product. Each of these printed layers may be a thinly-sliced, horizontal cross-section of the eventual object. Throughout the process, the different layers may be automatically fused to create a single three-dimensional object.

Some three-dimensional printers may comprise printing heads that print only downwards (e.g., having no pitch and roll movements, and optionally no yaw movement). In some exemplary embodiments, printing on existing objects may be difficult or infeasible due to base object shape, external surface, texture, material composition, or the like. As an example, disposing the printing material on an edge of a spherical object may not be possible using regular three-dimensional printers, as the printing material may drip downwards. Furthermore, in such downward-only printers, the nozzle of the print-head may need to be positioned adjacent to a side of an object if material is to be added at its side, however, the geometry of the print-head itself may now allow such positioning.

In some exemplary embodiments, printing onto existing objects may be used to repair the existing objects, rebuilt the existing objects, fix the existing objects, or the like. In some exemplary embodiments, producing products from the beginning may be impossible, difficult, expensive or otherwise challenging.

Another technical problem dealt with by the disclosed subject matter is to print on a lateral edge of an object or similar side portion thereof. Prior art print-heads usually have a nozzle at the center of the print-head bottom that is surrounded with a coil heater. Such configuration is suitable for using additive manufacturing process for producing an object, but may provide geometric constraints hindering the ability of the printer to add material to an existing object in every desired location.

One technical solution is a print-head unit that can horizontally rotate, and having a nozzle located at a lateral portion of the print-head unit. The nozzle may be positioned so as to allow the nozzle to adjoin lateral edges of an existing object. The nozzle may be utilized to extrude printing material for producing the product by adding layers of materials on the existing object.

In some exemplary embodiments, the print-head may be moveable in four degrees of movement, thereby enabling the positioning the nozzle in different locations touching the existing object. In some exemplary embodiments, the print-head may be moved left/right, back/forth thus controlling the X,Y coordinates in a layer in which material is extruded. The print-head may be moved up/down to control the specific layer in which material is extruded. The print-head may be rotated about a horizontally (e.g., perform yaw movement) to allow different positioning of the nozzle in case the print-head geometry limits accessibility of the nozzle to a desired printing location.

In some exemplary embodiments, the nozzle may be located at the bottom the print-head unit. The nozzle located in a manner allowing the nozzle to be positioned vertically adjoining the existing object. Such positioning may be useful for adding material to lateral portions of the existing object.

In some exemplary embodiments, a heating component that is used to heat the printing material while in a flow channel of the print-head to facilitate its extrusion may partially surround the nozzle. As an example, the print-head may have a shape of a cylindania (e.g., a cylinder cut perpendicular to its circle bases). The nozzle may be position in a lateral portion of the cylindania, such as on the center of the circle half of which forms the base of the cylindania. The heating component may be comprised by the remainder of the half circle base partially surrendering the nozzle and enabling heating of material contained therein.

Figure 1A:
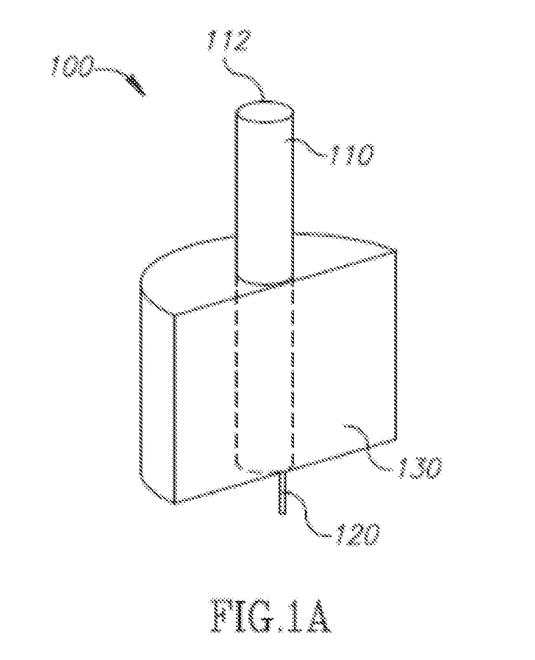
FIGS. 1A-1B show schematic illustrations of print-head units, in accordance with some exemplary embodiments of the disclosed subject matter.
Figure 1B:
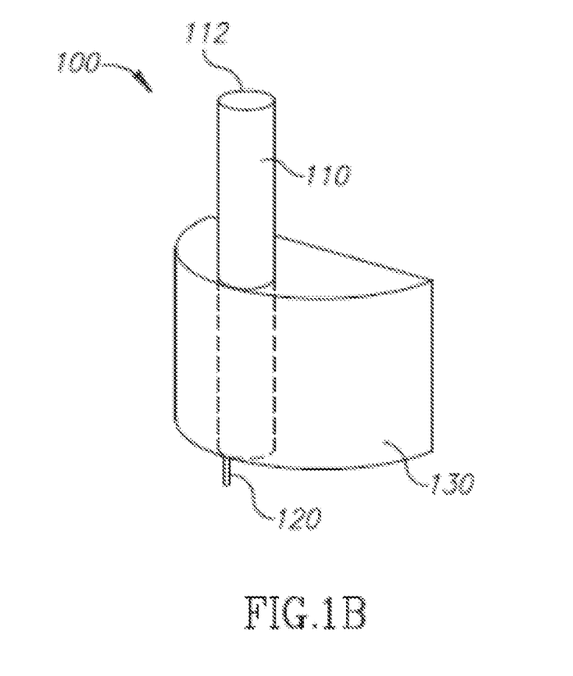

Referring now to FIGS. 1A and 1B, showing a print-head unit, in accordance with some exemplary embodiments of the disclosed subject matter.

Print-Head Unit 100 may be a part of an additive manufacturing apparatus, such as a three-dimensional printer. In some exemplary embodiments, the print-head of the three-dimensional printer may be replaceable so as to allow a user to change the active print-head. In some exemplary embodiments, a detachable print-head unit in accordance with the disclosed subject matter may be installed on an existing additive manufacturing apparatus which may not be originally configured to produce products in accordance with the disclosed subject matter. Additionally or alternatively, the additive manufacturing apparatus may control movement along three perpendicular axes and may be incapable of controlling rotation along any of the axes. A replaceable/detachable print-head unit may include a rotational motor capable of rotating the print-head unit itself about a vertical axis passing through the print-head unit. Such print-head unit may increase the number of degrees of freedom involved in the additive manufacturing process. In some exemplary embodiments, print-head unit may include a communication module used for receiving instructions from a controlling software. The controlling software may issue commands to a controller module of the additive manufacturing apparatus when X,Y,Z movement is required or when material needs to be extruded. The controller module may implement such commands, such as by operating components of the additive manufacturing apparatus, including the print-head unit. However, when a yaw movement is required, the controlling software may bypass the controller module which may be unaware of such commands and how they can be implemented, and transmit the commands to the communication module of print-head unit.

In some exemplary embodiments, Print-Head Unit 100 may comprise a Flow Channel 110. Flow Channel 110 may have an Inlet End 112 and an outlet end. Inlet End 112 may be configured to receive printing material, such retained in a cartridge or processed by a cold end of the three-dimensional printer (not shown).

In some exemplary embodiments, Print-Head Unit 100 may comprise a Nozzle 120. Nozzle 120 may be coupled to outlet end. Additionally or alternatively, the outlet end may be Nozzle 120 itself. Nozzle 120 may be configured to extrude the printing material from Flow Channel 110 onto a workplace. The workplace may be a part of the three-dimensional printer comprising Print-Head Unit 100 where the product is produced.

In some exemplary embodiments, Nozzle 120 may be located at a lateral portion of Print-Head Unit 100. In some exemplary embodiments, Nozzle 120 may be located at a tangent line or plane to a side of Print-Head Unit 100. Locating Nozzle 120 at the lateral portion may eliminate any geometric limitations on the accessibility of Nozzle 120 to lateral sides of existing objects.

In some exemplary embodiments, Nozzle 120 may be located at the bottom Print-Head Unit 100. Nozzle 120 may be located in a manner allowing Nozzle 120 to be positioned vertically adjoining an object in the workplace.

In some exemplary embodiments, Print-Head Unit 100 may comprise a Heating Component 130. Heating Component 130 may be configured to heat the printing material while in Flow Channel 110. Heating Component 130 may be configured to heat the printing material to a temperature at which the printing material is flowable and can be used in an additive manufacturing process.

In some exemplary embodiments, Print-Head Unit 100 may be configured to horizontally rotate. Print-Head Unit 100 may be configured to horizontally rotate around Nozzle 120 or around a different axis parallel to Nozzle 120.

In FIG. 1A, Nozzle 120 is located at the bottom of Print-Head Unit 100 at a center of an imaginary circle that is halved to form the base of Heating Component 130. In FIG. 1B an alternative embodiment is depicted in which Nozzle 120 is located on a radius of the imaginary circle. In both instances, Nozzle 120 is located at a lateral portion of Print-Head Unit 100 and has no limitation on its lateral accessibility at least from one side of the Print-Head Unit 100. By allowing a yaw movement to rotate Print-Head Unit 100, the Nozzle 120 may be positioned so as to overcome any lateral accessibility limitation. Such movement may provide lateral accessibility of 360°.

In some exemplary embodiments, Print-Head Unit 100 may be moveable along each of X,Y,Z axis. Such movement may be provided using a robotic arm (not shown) carrying Print-Head Unit 100. Flow Channel 110 may be comprised within the robotic arm. In some exemplary embodiments, the robotic arm may further provide yaw movement rotating around its vertical axis. Additionally or alternatively, robotic arm may not provide for yaw movement and instead such movement may be implemented using a motor (not shown) comprised by Print-Head Unit 100 itself.

Figure 1C:
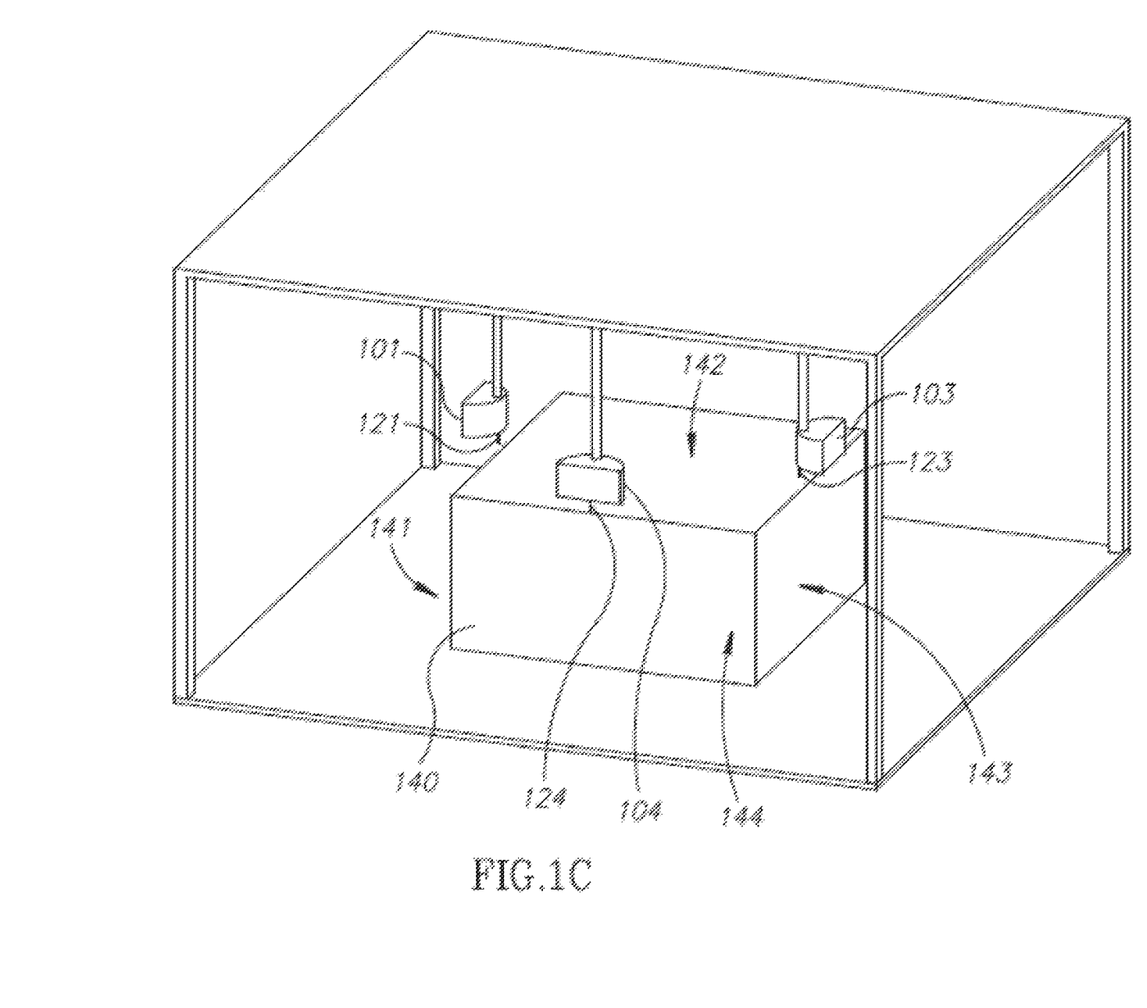
FIG. 1C shows a schematic illustration of a three-dimensional printer, in accordance with some exemplary embodiments of the disclosed subject matter.

Referring now to FIG. 1C, showing an illustration of a three-dimensional printer, in accordance with some exemplary embodiments of the disclosed subject matter.

Base Object 140 may have several sides to which material may be added, such as 141, 143, 144. Material may also be added to Top 142 of Base Object 140.

FIG. 1C exemplifies that different print-head units may be used within a single three-dimensional printer. However, a single print-head unit may be used instead.

Nozzle 123 of Print-Head 103 is adjacent Side 143 as the only geometric constraint Print-Head 103 provides is at the opposing direction to Side 143. Nozzle 123 may be used to add material next to Side 143. Similarly, Nozzle 124 of Print-Head 104 is adjacent Side 144, Nozzle 121 of Print-Head 101 is adjacent Side 121. As can be appreciated, different sides require different rotation of the print-head unit in order to allow its nozzle to be properly placed adjacent to the desired side. Yaw movement of the print-head may enable it to be properly positioned for adding material to an existing base object. A similar approach may be used when adding material besides any lateral portion of an existing base object.

Figure 2:
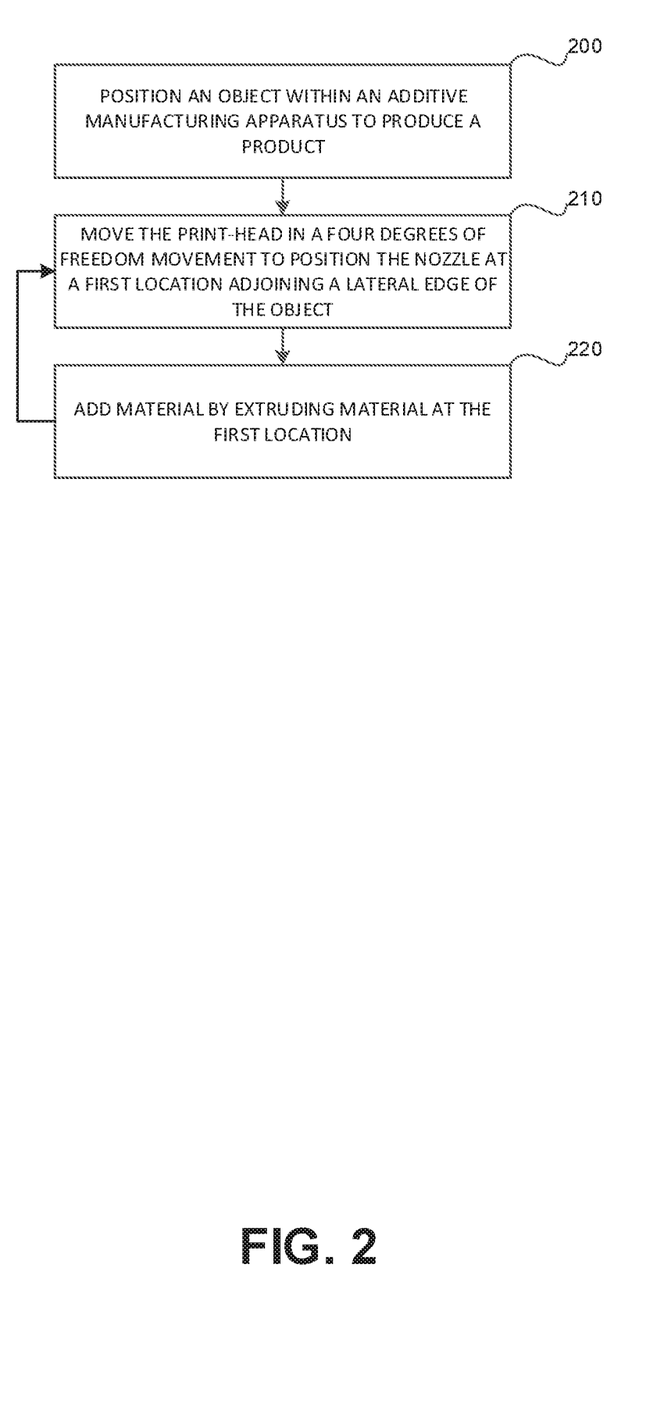
FIG. 2 shows a flowchart diagram of a method, in accordance with some exemplary embodiments of the disclosed subject matter.

Referring now to FIG. 2, showing a flowchart diagram of a method in accordance with some exemplary embodiments of the disclosed subject matter.

In Step 200, an object may be positioned within an additive manufacturing apparatus to be used as a base object for producing the product. The product may be produced using the additive manufacturing apparatus. The product may be produced by adding layers of material on the object. In some exemplary embodiments, the additive manufacturing apparatus may have a print-head unit and a workspace. The print-head unit may comprise a nozzle for extruding printing material. The object may be located in the workspace. In some exemplary embodiments, the workspace may be a three dimensional space in which the print-head can operate.

In some exemplary embodiments, the object may be positioned manually. In some exemplary embodiments, the manual positioning of the object may be in response to an instruction or notification issued by the three-dimensional printer.

In Step 210, the print-head unit may be moved in four degrees of freedom movement to position the nozzle at a first location. The first location may be adjoining a lateral edge of the object. In some exemplary embodiments, the four degrees of freedom movement may include a movement along three perpendicular axes and a yaw rotation about a vertical axis, and exclude pitch and roll rotations.

In Step 220, material may be added on the object by extruding printing material at the first location. In some exemplary embodiments, material may be extruded adjoining the object and fused therewith. In some exemplary embodiments, the printing material may be transferred, sprayed, squeezed or otherwise extruded from the nozzle.

After Step 220, the print-head unit may be moved in the four degrees of freedom movement to position the nozzle at a second location. The second location may be adjoining a second lateral edge of the object. In the second location additional material may be extruded. Steps 210-220 may be performed iteratively until the product is completed. In some exemplary embodiments, some or all of the locations may not be adjoining a lateral edge of the object.

Figure 3A:
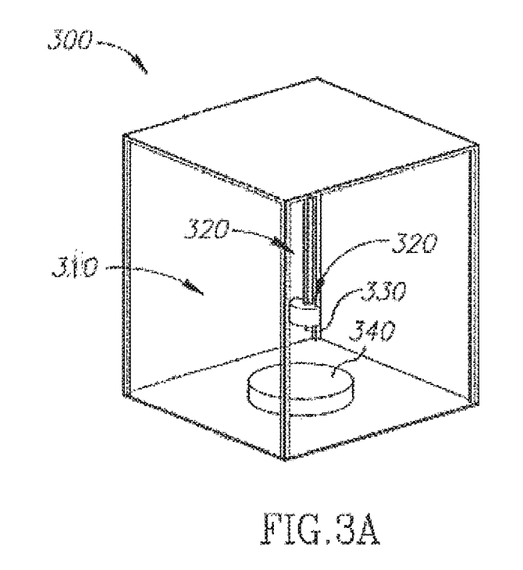
FIGS. 3A-3C show a schematic illustration of an additive manufacturing process, in accordance with some exemplary embodiments of the subject matter.
Figure 3B:
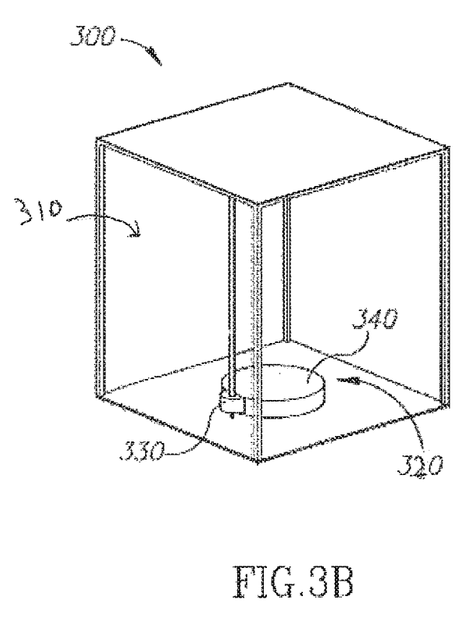
Figure 3C:
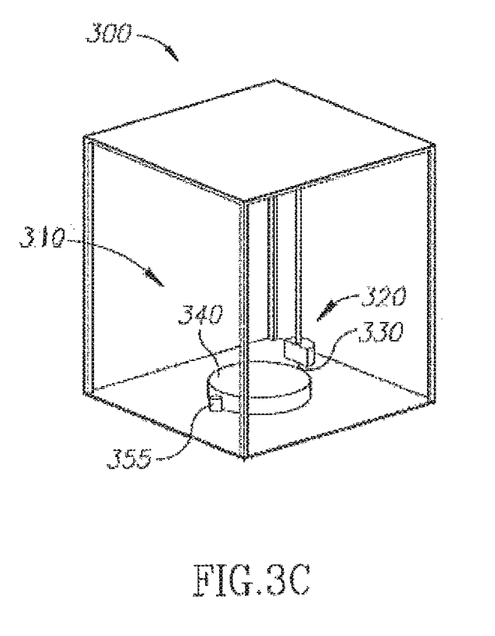

Referring now to FIGS. 3A-3C, showing schematic illustrations of additive manufacturing process. in accordance with some exemplary embodiments of the disclosed subject matter.

An Additive Manufacturing Apparatus 300 may be configured to produce three-dimensional products by extruding material within a Workspace 310. In some exemplary embodiments, Additive Manufacturing Apparatus 300 may have a Print-Head Unit 320. Print-Head Unit 320 may comprise a Nozzle 330. Nozzle 330 may be configured to extrude the printing material. In some exemplary embodiments, Print-Head Unit 320 may be utilized to move in a four degrees of freedom movement. In some exemplary embodiments, the four degrees of freedom movement may include a movement along three perpendicular axes and a yaw rotation about a vertical axis.

In some exemplary embodiments, an Object 340 may be placed in Workspace 310. Object 340 may be an existing object, such as a base objet to be completed, a damaged object to be fixed, or the like.

In some exemplary embodiments, Print-Head Unit 320 may be moved in the four degrees of freedom movement to position Nozzle 330 at a first location that is adjoining a lateral edge of Object 340. Material may be added at the first location by extruding printing material from Nozzle 330. The material may be fused to form New Object 355 which may be fused together with Object 340 and become integral portion thereof.

In some exemplary embodiments, Print-Head Unit 320 may be moved in the four degrees of freedom movement to position Nozzle 330 at another location to proceed with the production of the desired product.

As can be appreciated the geometric shape of Print-Head Unit 310 in which Nozzle 330 is located at a lateral portion thereof, allows Nozzle 330 to be placed in locations that are adjoining existing objects, such as Object 340. By turning Print-Head Unit 310, such as using a rotational motor deployed thereon, Nozzle 330 may be positioned next to any lateral edge of existing object.

It will be noted that after Nozzle 330 is located at a first height position (Y1), Nozzle 330 may be lowered to a reduced height position (Y2<Y1). For example, Nozzle 330 may be used to first create Object 340 and thereafter lowered to create New Object 355 besides Object 340.

In some cases, a first nozzle may be used to emit printing material to create Object 340. After which, a second nozzle, such Nozzle 330, may be used to emit printing material to form New Object 355.

Figure 4A:
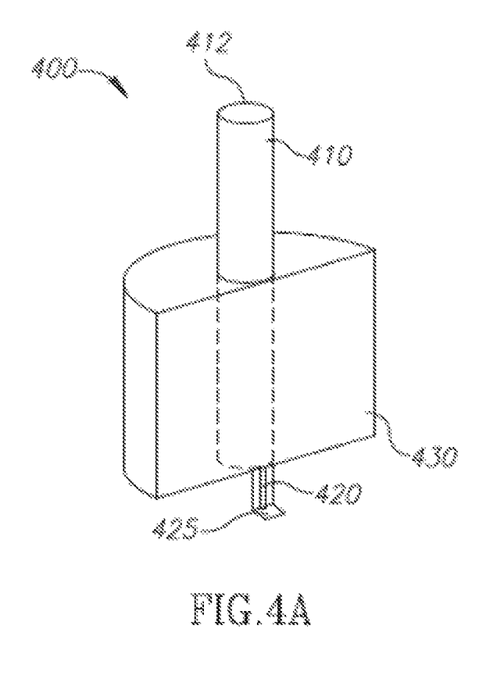
FIG. 4A-4B show schematic illustrations of a print-head unit and an object created using such print-head unit, in accordance with some exemplary embodiments of the disclosed subject matter.

Referring now to FIG. 4A showing an illustration of a print-head unit, in accordance with some embodiments of the disclosed subject matter.

In some exemplary embodiments, Print-Head Unit 400 may comprise a Flow Channel 410 having an Inlet End 412 and an outlet end which is coupled to Nozzle 420 to extrude printing material from Flow Channel 410. Print-Head Unit 400 may comprise a Heating Component 430 to liquidate printing material so as to flow through Flow Channel 410.

In some exemplary embodiments, Platform 425 may be substantially orthogonal to Flow Channel 410. A drop of liquidated printing material extruded through Nozzle 420 may drop on Platform 425 and may be fused to existing object without relying on having a support structure below the newly added voxel. In some embodiments, Platform 425 may have a downward slope so as to assist the drop to slide and be attached sideways. The downward slope may be of any angle between about 0° and about 60°. In some cases, the slope is below about 45°, below about 30°, below about 15°, or the like. In some cases, Platform 425 may be formed of material which does not bond with the printing material when such material cools down. Additionally or alternatively, Platform 425 may be heated slightly thereby allowing the drop to cool down and fuse with other surfaces but not with Platform 425 as the portion of the drop touching Platform 425 does not cool down. In some exemplary embodiments, Platform 425 may be fixed as part of the print-head unit, which may be detachable and used upon demand. Additionally or alternatively, Platform 425 may be configured to be retracted, removed, or otherwise displaced so as to allow Print-Head Unit 400 to emit printing material downwards and not solely sideways. In some exemplary embodiments, Platform 425 is located so as to extend beyond Print-Head Unit 400 so as to be a sideway extension that is perpendicular to Flow Channel 410. Additionally or alternatively, Platform 425 is located below Nozzle 420 and does not extend beyond the lateral edge to which Nozzle 420 is adjoined so as to not impose geometrical limitations that would prevent Print-Head Unit 400 from being positioned vertically adjoining a target object.

Figure 4B:
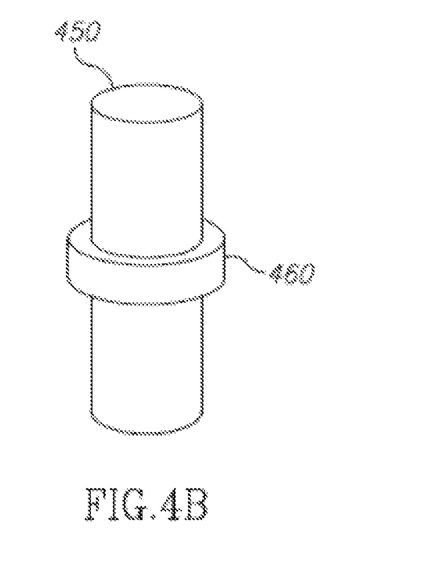

FIG. 4B exemplifies an object created using Print-Head Unit 400. An Addition 460 to an existing object, Object 450, is created. As Addition 460 is created at a location where there is no vertical support, printing material extruded would drip down and not fuse at the desired vertical location. Print-Head Unit 400 may be positioned so as to place Platform 425 adjoining Object 450 is the desired vertical location. Emitted printing material is then fused in the desired location using the support provided by Platform 425. In some exemplary embodiments, through the use of a platform, scaffolds and other support structures, such as described in a patent application entitled "THREE DIMENSIONAL PRINTING ON THREE DIMENSIONAL OBJECTSTHREE DIMENSIONAL PRINTING ON THREE DIMENSIONAL OBJECTS", which is filed concurrently with the present application, and which is hereby incorporated by reference in its entirety without giving rise to disavowment, may not be required.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A print-head unit for use in an additive manufacturing apparatus, the print-head unit comprising:
   a flow channel having an inlet end and an outlet end, wherein said inlet end is configured to receive printing material, wherein the flow channel defining a flow direction in accordance with a longitudinal axis of said print-head unit; and
   a nozzle coupled to said outlet end of said flow channel, wherein said nozzle is configured to extrude the printing material from said flow channel onto a workplace, wherein said nozzle is parallel to the longitudinal axis of said print-head unit, wherein said nozzle is tangent to an external side wall of said print-head unit, wherein a tangent plane comprising said nozzle is parallel to the longitudinal axis and tangent to the external side wall of said print-head unit;
   wherein said print-head unit is configured to horizontally rotate; and
   wherein said print-head unit is configured to move in three perpendicular axes in addition to being configured to rotate horizontally around a vertical axis, thereby the print-head having exactly four degrees of freedom.

2. The print-head unit of claim 1, wherein said nozzle is located in the print-head unit in a manner allowing said nozzle to have a vertical flow direction in said flow channel and be positioned vertically adjoining a lateral edge of an object in the workplace and below a top surface of the object.

3. The print-head unit of claim 1, wherein said print-head unit is detachable from the additive manufacturing apparatus, wherein said print-head unit comprising a motor configured to horizontally rotate the print-head unit providing a single degree of freedom.

4. The print-head unit of claim 3, wherein said print-head unit is configured to move in three perpendicular axes, wherein the movement in the three perpendicular axes is performed by one or more motors external to said print-head unit, wherein the one or more motors are mounted on the additive manufacturing apparatus.

5. The print-head unit of claim 1 further comprising a platform located below said nozzle, wherein said platform is positioned so as to receive printing material extruded from said nozzle.

6. The print-head unit of claim 5, wherein said platform is positioned so as to direct the printing material in a direction that is substantially perpendicular to said flow channel.

7. The print-head unit of claim 5, wherein said platform is displaceable, wherein in a displaced mode, said platform does not receive the printing material extruded from said nozzle.

8. A print-head unit for use in an additive manufacturing apparatus, the print-head unit comprising:
   a flow channel having an inlet end and an outlet end, wherein said inlet end is configured to receive printing material, wherein the flow channel defining a flow direction in accordance with a longitudinal axis of said print-head unit; and
   a nozzle coupled to said outlet end of said flow channel, wherein said nozzle is configured to extrude the printing material from said flow channel onto a workplace, wherein said nozzle is parallel to the longitudinal axis of said print-head unit, wherein said nozzle is tangent to an external side wall of said print-head unit, wherein a tangent plane comprising said nozzle is parallel to the longitudinal axis and tangent to the external side wall of said print-head unit,
   wherein said print-head unit is configured to horizontally rotate around a vertical axis.

9. The print-head unit of claim 8, further comprises:
   a heating component configured to heat the printing material while in said flow channel, wherein said heating component partially surrounds said nozzle in a horizontal plane orthogonal to the longitudinal axis.

10. The print-head unit of claim 9, wherein said heating component is configured to heat the printing material to a temperature at which the printing material is flowable.

11. The print-head unit of claim 8, wherein said nozzle is located at the bottom of said print-head unit.

12. The print-head unit of claim 8, wherein said nozzle is located in the print-head unit in a manner allowing said nozzle to have a vertical flow direction in said flow channel and be positioned vertically adjoining a lateral edge of an object in the workplace and below a top surface of the object.

13. The print-head unit of claim 8, wherein said print-head unit is detachable from the additive manufacturing apparatus, wherein said print-head unit comprising a motor configured to horizontally rotate the print-head unit providing a single degree of freedom.

14. The print-head unit of claim 13, wherein said print-head unit is configured to move in three perpendicular axes, wherein the movement in the three perpendicular axes is performed by one or more motors external to said print-head unit, wherein the one or more motors are mounted on the additive manufacturing apparatus.

15. The print-head unit of claim 8 further comprising a platform located below said nozzle, wherein said platform is positioned so as to receive printing material extruded from said nozzle.

16. The print-head unit of claim 15, wherein said platform is positioned so as to direct the printing material in a direction that is substantially perpendicular to said flow channel.

17. The print-head unit of claim 15, wherein said platform is displaceable, wherein in a displaced mode, said platform does not receive the printing material extruded from said nozzle.

18. A print-head unit for use in an additive manufacturing apparatus, the print-head unit comprising:
- a flow channel having an inlet end and an outlet end, wherein said inlet end is configured to receive printing material, wherein the flow channel defining a flow direction in accordance with a longitudinal axis of said print-head unit;
- a nozzle coupled to said outlet end of said flow channel, wherein said nozzle is configured to extrude the printing material from said flow channel onto a workplace, wherein said nozzle is parallel to the longitudinal axis of said print-head unit, wherein said nozzle is tangent to an external side wall of said print-head unit, wherein a tangent plane comprising said nozzle is parallel to the longitudinal axis and tangent to the external side wall of said print-head unit;
- a platform located below said nozzle, wherein said platform is positioned so as to receive printing material extruded from said nozzle; and
- a heating component that is coupled to said platform, wherein said heating component is configured to heat said platform, and
- wherein said print-head unit is configured to horizontally rotate.

19. A detachable print-head unit for use in an additive manufacturing apparatus, wherein the additive manufacturing apparatus configured to move an attached print-head unit in three perpendicular axes, the print-head unit comprising:
- a flow channel having an inlet end and an outlet end, wherein said inlet end is configured to receive printing material, wherein the flow channel defining a flow direction in accordance with a longitudinal axis of said print-head unit;
- a nozzle coupled to said outlet end of said flow channel, wherein said nozzle is configured to extrude the printing material from said flow channel onto a workplace, wherein said nozzle is parallel to the longitudinal axis of said print-head unit, wherein said nozzle is tangent to an external side wall of said print-head unit, wherein a tangent plane comprising said nozzle is parallel to the longitudinal axis and tangent to the external side wall of said print-head unit; and
- a motor configured to horizontally rotate said detachable print-head unit, thereby, when said detachable print-head unit is attached to the additive manufacturing apparatus, said detachable print-head unit having exactly four degrees of freedom movement.

20. The print-head unit of claim 2, wherein the tangent plane is tangent to the lateral edge of the object.

21. The print-head unit of claim 2, wherein the object was not manufactured by the additive manufacturing apparatus.

22. The print-head unit of claim 21, wherein the object comprises a damaged object, wherein said nozzle is configured to extrude the printing material to fix the damaged object.

* * * * *